United States Patent
Chang et al.

(10) Patent No.: US 9,998,550 B2
(45) Date of Patent: Jun. 12, 2018

(54) NETWORK BASED SERVICE COMPOSITION WITH VARIABLE CONDITIONS

(71) Applicant: International Business Machines Corporation, Armonk, NY (US)

(72) Inventors: Rong N. Chang, Pleasantville, NY (US); Vinod Muthusamy, Peekskill, NY (US); Wei Tan, Elmsford, NY (US); Fei Wang, Ossining, NY (US); John E. Wittern, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 252 days.

(21) Appl. No.: 14/864,263

(22) Filed: Sep. 24, 2015

(65) Prior Publication Data

US 2017/0093633 A1 Mar. 30, 2017

(51) Int. Cl.
*G06F 15/173* (2006.01)
*H04L 29/08* (2006.01)

(52) U.S. Cl.
CPC ............. *H04L 67/16* (2013.01); *H04L 67/02* (2013.01); *H04L 67/322* (2013.01)

(58) Field of Classification Search
CPC ........ H04L 67/16; H04L 67/02; H04L 67/322
USPC ........................................................ 709/241
See application file for complete search history.

(56) References Cited

U.S. PATENT DOCUMENTS

| | | |
|---|---|---|
| 8,510,751 B2 | 8/2013 | Saha et al. |
| 2006/0212932 A1* | 9/2006 | Patrick ................ H04L 63/1441 726/11 |
| 2009/0281845 A1* | 11/2009 | Fukuda ............ G06Q 10/06393 705/7.39 |
| 2013/0132148 A1 | 3/2013 | Trummer et al. |
| 2013/0104134 A1 | 4/2013 | Chen et al. |
| 2015/0066929 A1* | 3/2015 | Satzke ................ G06N 99/005 707/737 |

OTHER PUBLICATIONS

Flow Recommender: A Workflow Recommendation Technique for Process Provenance (AusDM'09) by Ji Zhang, Qing Liu and Kai Xu (p. 59).*
Kalasapur, S., et al., "Dynamic service composition in pervasive computing", IEEE Transactions on Parallel and Distributed Systems, Jul. 2007, pp. 907-918, vol. 18, No. 7.

(Continued)

*Primary Examiner* — John Macilwinen
*Assistant Examiner* — Tan Doan
(74) *Attorney, Agent, or Firm* — Scully, Scott, Murphy & Presser, P.C.; Louis J. Percello, Esq.

(57) ABSTRACT

Network based service composition with variable distance conditions may be provided. A workflow definition may be received and a network topology may be built based on the workflow definition. Relational data may be received and a network instance may be built based on the network topology and the distance measurement. A plurality of network instances may be built, for example, for different distance conditions. One or more paths may be determined for a pair of services based on one or more of the network instances.

20 Claims, 4 Drawing Sheets

(56) References Cited

OTHER PUBLICATIONS

Gekas, J., et al., "Automatic web service composition based on graph network analysis metrics", On the Move to Meaningful Internet Systems (Month not known) 2005: CoopIS, DOA, and ODBASE, pp. 1571-1587, Springer Berlin Heidelberg, 2005.

Rahmani, H., et al., "Automatic web service composition considering user non-functional preferences", 4th International Conference on Next Generation Web Services Practices, Oct. 2008, pp. 33-38, NWESP'08, IEEE.

Alrifai M., et al., "Combining global optimization with local selection for efficient QoS-aware service composition", Proceedings of the 18th international conference on World wide web. ACM, Apr. 20-24, 2009, pp. 881-890, Madrid, Spain.

Fujii K., et al., "Semantics-based context-aware dynamic service composition", ACM Transactions on Autonomous and Adaptive Systems (TARS) May 2009, pp. 12:1-12:31, vol. 4, No. 2, Article 12.

Lee, Y.-J., "Automatic Web API Composition for Semantic Data Mashups", 4th Int. Conf. on Computational Intelligence and Communication Networks, Nov. 2012, pp. 953-957.

Wittern, E., et al. "A Graph-based Data Model for API Ecosystem Insights," International Conference on Web Services (ICWS), Jun. 27, 2014-Jul. 2, 2014, IEEE, pp. 41-48.

Huang, K., et al., "An Empirical Study of Programmable Web: A Network Analysis on a Service-Mashup System", ICWS, Jun. 2012, pp. 552-559.

Huang, K., et al., "Service Recommendation in an Evolving Ecosystem: A Link Prediction Approach", ICWS, Jun. 28, 2013-Jul. 3, 2013, pp. 507-514.

Huang, K., et al., "Mirror, Mirror, on the Web, which is the most reputable service of them all?—A Domain-aware and Reputation-aware Method for Service Recommendation", ICSOC, (month not known) 2013, pp. 343-357.

Koop, D., et al., "VisComplete: Automating Suggestions for Visualization Pipelines", IEEE Transactions on Visualization and Computer Graphics, Nov./Dec. 2008, pp. 1691-1698, vol. 14, No. 6.

Van Der Aalst, W. M. P., "TomTom for Business Process Management (TomTom4BPM)", CAiSE (Month not known) 2009, pp. 2-5, Springer-Verlag Berlin Heidelberg.

Chen, W., et al., "Linked Social Service: Connecting Isolated Services into a Global Social Service Network," Services Computing Conference (APSCC), Dec. 2012, pp. 217-224, IEEE Asia-Pacific.

Tan, W., et al., "ServiceMap: Providing Map and GPS Assistance to Service Composition in Bioinformatics", IEEE SCC, Jul. 4-9, 2011, pp. 632-639.

Tan, W., et al., "Network Analysis of Scientific Workflows: A Gateway to Reuse", IEEE Computer, Sep. 2010, pp. 54-61, vol. 43, No. 9.

* cited by examiner

NETWORK BASED SERVICE COMPOSITION WITH VARIABLE CONDITIONS

FIELD

The present application relates generally to computers and computer applications, and more particularly to computer-implemented service operations and programming interfaces, e.g., World Wide Web (Web) services and Web application programming interfaces (APIs), and compositions thereof.

BACKGROUND

The current service composition approaches lack a mechanism to identify and efficiently use relevant services or process workflows that span multiple services. This problem may arise generally as a result of two main factors: First, composition approaches are not aware of the existence of the relevant services and workflows from which to compose the service composition; Second, composition approaches do not know how to use the services or workflows, while considering the possible set of best practices associated with the services or workflows.

BRIEF SUMMARY

A computer-implemented method and system of providing a network-based service composition may be provided. The method, in one aspect, may include receiving a plurality of workflow definitions. A workflow definition may comprise computer-implemented service operations and relational flows that connect the computer-implemented service operations. The method may also include building a network topology based on the workflow definitions. The method may also include receiving distance measurements that measure distance from a computer-implemented service operation to another computer-implemented service operation, the distance measurements determined according to a selected metric. The method may also include building a network instance based on the network topology and the distance measurements.

In another aspect, the method may include receiving identification of at least two computer-implemented services. The method may also include determining a shortest path between the two computer-implemented services based on the network instance. The method may also include retrieving, from the workflow definitions, workflow snippets that form the shortest path. The method may also include constructing the workflow snippets into a new workflow.

A system of providing a network based service composition, in one aspect, may include a memory device and one or more hardware processors operatively coupled to the memory device. One or more of the hardware processors may be operable to receive a plurality of workflow definitions, a workflow definition comprising computer-implemented service operations and relational flows that connect the computer-implemented service operations. One or more of the hardware processors may be further operable to build a network topology based on the workflow definitions. One or more of the hardware processors may be further operable to receive distance measurements that measure distance from a computer-implemented service operation to another computer-implemented service operation, the distance measurements determined according to a selected metric. One or more of the hardware processors may be further operable to build a network instance based on the network topology and the distance measurements, and store the network instance in the memory device.

In one aspect, one or more of the hardware processors may include a search engine operable to receive identification of at least two computer-implemented services. The search engine may be further operable to determine a shortest path between the two computer-implemented services based on the network instance. The search engine may be further operable to retrieve from the workflow definitions, workflow snippets that form the shortest path. The search engine may be further operable to construct the workflow snippets into a new workflow.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1:
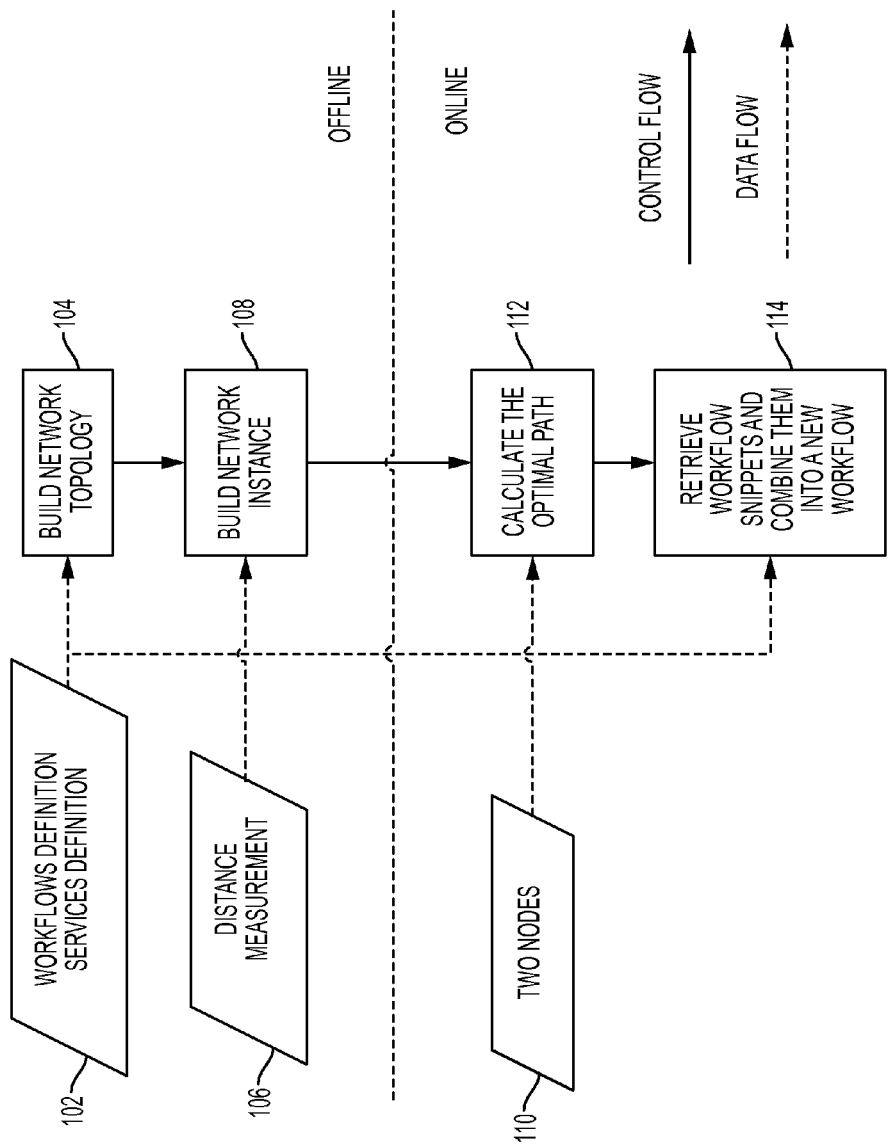
FIG. 1 is a flow diagram illustrating an overview of a method of a framework for composing a network-based service in one embodiment of the present disclosure.

A system, method and/or techniques in the present disclosure in one embodiment may utilize network information around Web services to foster service composition. In the present disclosure, an embodiment of a system, method and/or technique may use historic workflow data and custom conditions for distance measures to obtain such network information. An embodiment of a system, method and/or technique may then use this information to propose new workflows that comprise a set of desired services. Services, for example, can be of diverse type, spanning Web Services Description Language (WSDL)/Simple Object Access Protocol (SOAP)—based services and Representational State Transfer (REST) services. By leveraging a broad set of historic workflows, the proposed workflows contain services and usage patterns of services and/or workflows, and are able to address or incorporate best practices (e.g., customize commonly used services and workflows in a particular community, among particular group of users, and in particular patterns), which may otherwise be missed in composition.

In one aspect, a system, method and/or technique of the present disclosure may provide a search engine capability for finding Web services and/or interfaces on the Internet.

An aspect of an embodiment of a system, method and/or technique may start by building a network topology from existing service definitions and historic workflow definitions. This topology may be then transferred into a single or multiple network instances, each using any of a set of proposed conditions or criteria, for example, referred to as distance conditions or measures. These measures, for example, consider the number of appearances of an edge in the provided historical workflows as weights. In one embodiment, the first two steps of a system, method and/or technique outlined above, may be performed offline once. Next, in an online phase, the derived network instance may be used to propose suited workflows for given tasks. Tasks are expressed in terms of a set of services (e.g., two services or more) to be used. In one embodiment, for the service network reflecting the desired distance measure, the shortest path between the nodes representing these services is calculated. In one embodiment, the historic workflows contributing to this path are extracted and combined to form an overall, proposed workflow. For instance, a new workflow connecting two services may be identified that crosses the least number of services, crosses the least number of existing workflows, or incurs the least cost.

Web services are used in Software-as-a-Service (for example, in API graph), mobile technologies, cloud computing, and service automation. Cognitive computing, for example, also may include Web services, e.g., for recommending and composing services. For example, a workflow generated as output according to an embodiment of the present disclosure may be treated as inputs to a placement algorithm that may physically place components in a computer environment, e.g., cloud environment. For example, in that scenario, the workflow output may control physical placement or migration of computer components. In one aspect, a system, method and/or techniques of the present disclosure address a design of a system and automatically creating an appropriate workflow. A system, method and/or techniques of the present disclosure in one embodiment may generate new workflows at design time based on knowledge of other existing workflows. Existing workflows may be used to derive a network, for example, without requiring semantic annotation.

A system, method and/or techniques of the present disclosure may provide a network based service composition, for example, for both WSDL and REST services, for example, utilizing variable conditions or criteria, e.g., distance measurements for determining the compositions. The system, method and/or technique of the present disclosure may be extended to generic tasks and solutions. In one aspect, a system, method and/or techniques of the present disclosure may derive a network made up of services and their linkages from a collection of existing workflows. A graph in one embodiment of the present disclosure represents relationships among services. Edges of the graph may be derived from historic workflows and may represent data or control flow. In this way, a global map from existing workflows or service compositions (e.g., obtained from workflow repositories) may be built, for example, considering both data and control flow, and considering quality of service (QoS) and other metrics for composition. The connectivity in the map may be derived from past usage and may reflect best practices. The map may also reveal cross-workflow connectivity.

Figure 4:
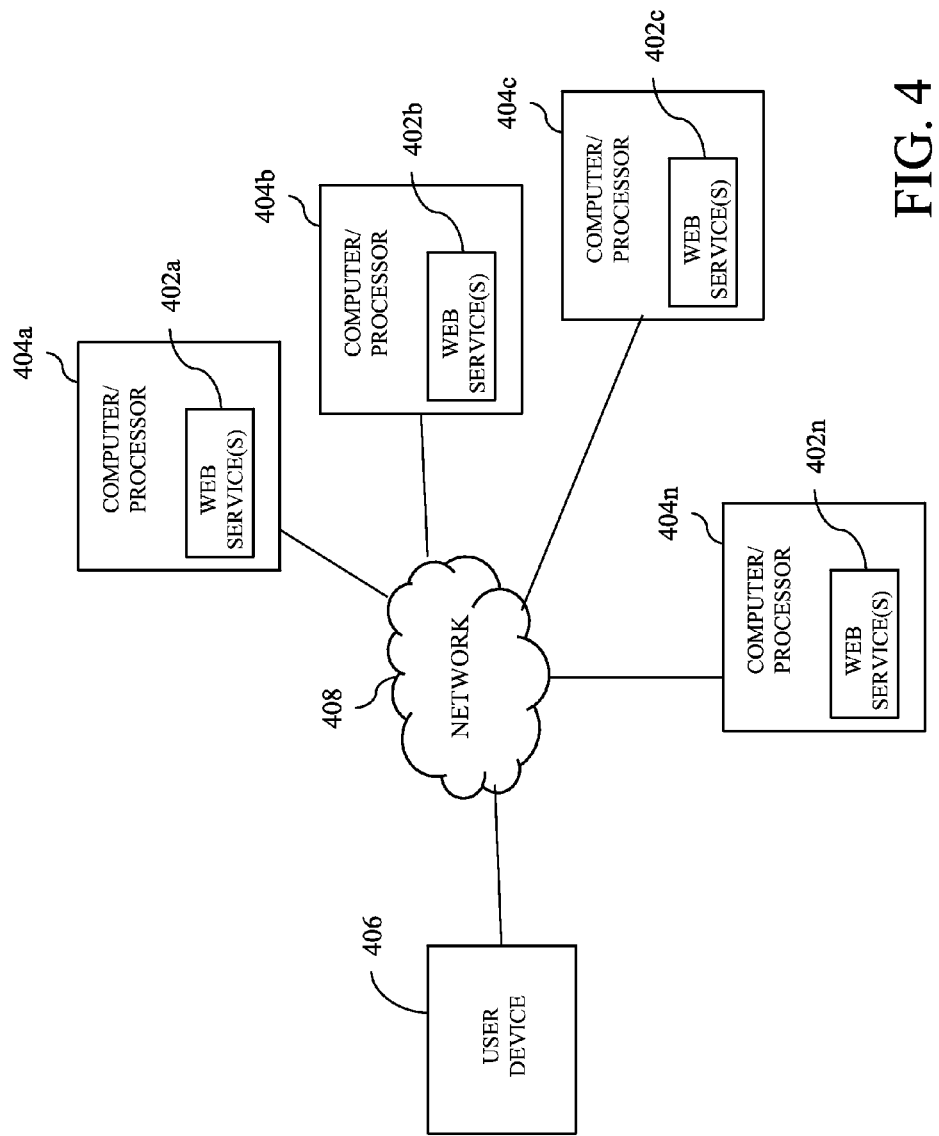
FIG. 4 shows a network of services such as Web services and/or Web APIs on one embodiment of the present disclosure.

FIG. 4 shows a network of services such as Web services and/or Web APIs on one embodiment of the present disclosure. The Web services and/or Web APIs 402*a*, 402*b*, 402*c*, 402*n* may exist in the Internet, for example, and may be located at different computers or processors 404*a*, 404*b*, 404*c*, 404*n*. The Web services and/or Web APIs 402*a*, 402*b*, 402*c*, 402*n* may be hosted by different companies or enterprises, providing a physical network of services over a network. Invoking a service (e.g., 402*a*) hosted by an enterprise in one or more computers (e.g., 404*a*) may be actuated by sending or transmitting a hypertext transfer protocol (HTTP) request with input content via a communication network (e.g., the Internet) 408 from a user computer or device (e.g., 406). The service (e.g., 402*a*) returns an HTTP response with output content.

Distance between the nodes in this network may be derived and an optimal path between the nodes in this network may be computed. For example, given a collection of workflows made up of services, a combined network may be derived that is made up of services and their linkages. Given a pre-defined relational data or distance measurement, the distance between services in this network may be derived from the distance between these services in individual workflows. Given two services, an optimal path may be computed with the pre-defined relational data or distance measurement from the network, in which relationship or distance between any pair of services has been computed.

In one embodiment, a distance measurement may be determined as follows: if two services are adjacent (invoked one after another) in any workflow, the distance between the two services may be measured as being 1; or, if two services are reachable in any workflow, the distance between the two services may be measured as being 1. The distance between two services may be computed as 1 divided by the number of occurrences where the two services are adjacent to each other in all workflows. According to this metric, the more occurrences there are of a pair of services directly connected to one another, the shorter the distance. In one embodiment, the function is reciprocal, so the first few such occurrences contribute more to reducing the distance than subsequent occurrences. If there are no such occurrences, the distance is infinite. In one embodiment, the domain of this metric is between 0 and 1 (excluding the infinite case), which makes it possible to sum the distances of different pairs of services without being skewed by the distance of a single pair.

In one aspect, the distance may be defined on nodes instead of edges, for example, the value that represents the cost of using that particular service. As another example, the distance may be defined on nodes rather than edges, for example, based on the value that represents the quality of service (QoS) value of using that particular service. QoS may be associated with invocation time, reliability and other factors.

In one aspect, services may include general tasks and workflows may include general solutions including many tasks.

FIG. 1 is a flow diagram illustrating an overview of a method of a framework for composing a network-based service in one embodiment of the present disclosure. Workflow definitions and service flow definition 102 that may include a collection of past workflows may be obtained, and at 104, service network topology is built based on the collection of past workflows. A service definition is a description of an individual service, which may include the inputs and output schema of the service and service level agreement (SLA) properties. A workflow definition is a description that captures the composition of a set of services, including the control edges, and conditions under which the edges are traversed. A system and method of the present disclosure may utilize workflow definition as well as service definition.

Workflow definition may be generated explicitly or implicitly. For example, when a user uses multiple services in a given sequence, the user is creating a "workflow".

Online workflow repositories may allow a user to submit his/her workflow definitions and store them. Workflow definition may be received or harvested from one or more of such repositories. In another aspect, workflow definition may be implicit. For example, a workflow may be retrieved from a sequence of service invocations. This sequence may be embedded in a computer program, or a textual description from a message, a blog, or the like: for instance, a blog may state that "a developer built an application that first invokes A, and then invokes B, and finally invokes C"). Such implicit workflow may be retrieved by performing data mining analysis and/or natural language processing analysis to create workflow definition of services.

Relational data or distance measurements may use workflow definition. Some distance measurements may use the service definition information. For example, there may be a distance measurement that favors services that have better SLA guarantees. Services and operations may be represented as nodes and connections between individual workflows may be represented as edges connecting the nodes. For instance, the edges of the nodes may represent relational flow between the nodes, for example, functional, control or data flows between the nodes. As another example, the nodes may represent service operations and a directed edge may represent a data link between two operations in a workflow.

Relational data also referred to as distance measurements computed between the edges 106 may be received and used to build a network instance at 108 from the network topology built at 104. For example, one or more service network instances may be derived from the service network topology. In one embodiment, the service network instance is built as a graph that is the union of the graphs in the input workflows. The edges of this graph are annotated with the relational data (e.g., distance measurements) computed above. From the same network topology, each network instance may be associated with a different relational data or distance measurement on edges. For instance, a separate service network instance can be created for each relational or distance condition (e.g., distance measurement metric or criteria). The service network instance may be stored in one or more storage or memory devices. Each network instance may share the same topology but has a different data or measurement on edge weights. Edge weights may be derived from individual workflows that form this service network.

Figure 2:
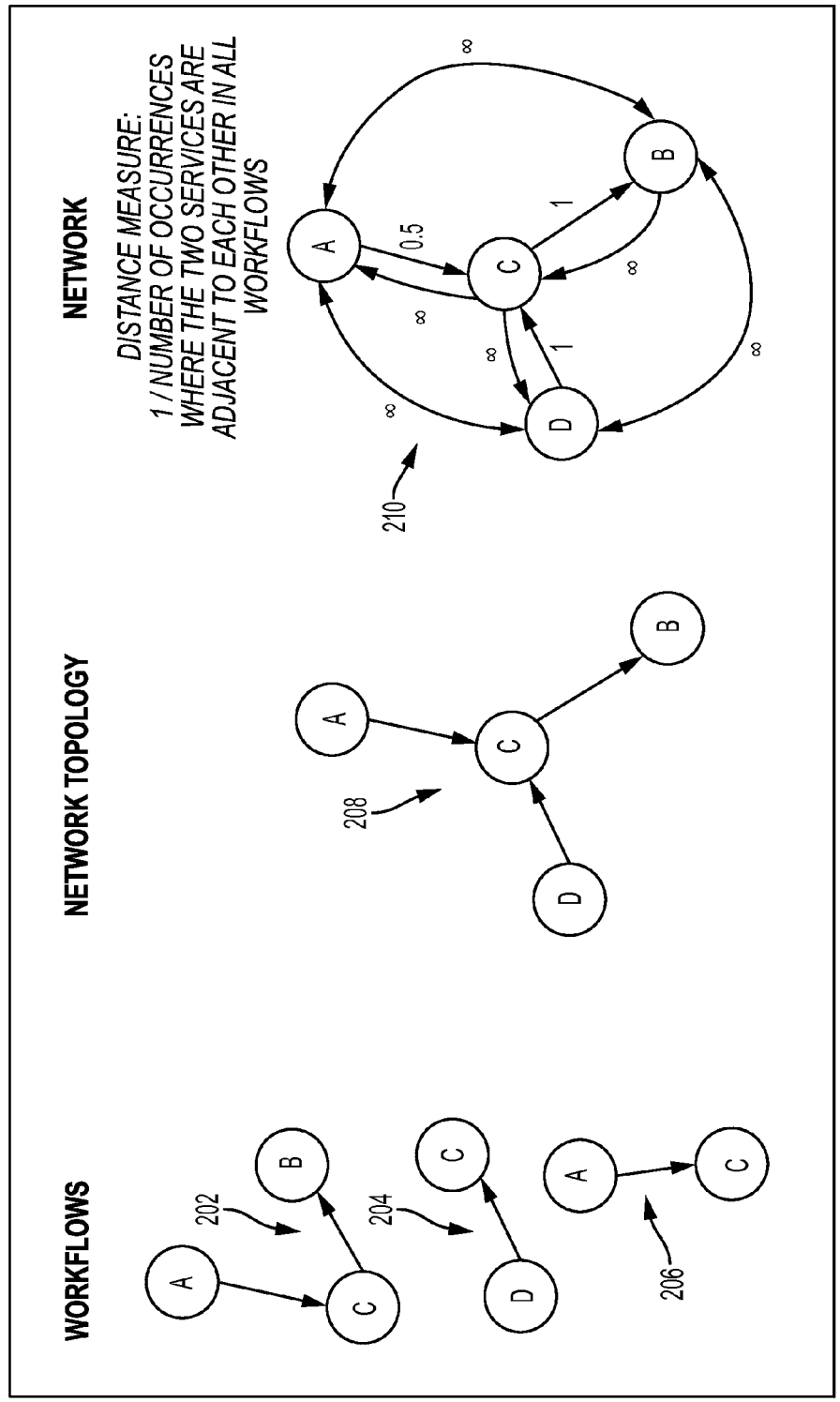
FIG. 2 is a diagram illustrating an example network topology and an example network instance built from the network topology in one embodiment of the present disclosure.

FIG. 2 is a diagram illustrating an example network topology built from workflows and an example network instance built from the network topology in one embodiment of the present disclosure. In the example shown in FIG. 2, there are four services A, B, C and D, and three workflows A→C→B (202), D→C (204), and A→C (206). A network topology 208 is built from the three workflows 202, 204, 206. In this example, the network topology 208 includes the union of all three workflows 202, 204, 206. Starting from this network topology 208, a network instance 210 may be built, e.g., by adding distance values to the directed edges. In the example shown in FIG. 2, the following distance measure is computed and used: 1/(number of occurrences where the two services are adjacent to each other in all workflows). For example, the directed edge A→C occurs in two workflows (A→C→B (202), and A→C (206)), therefore the distance is 1/2=0.5. As another example, the directed edge C→A does not occur in any workflow, therefore the distance is 1/0=∞.

Referring to FIG. 1, given two nodes 110 representing, for example, two services (e.g., Web services), a path between the nodes may be determined. For example, to find a path between any two services, based on one distance measurement, the network instance associated with that measurement may be used. For example, in one embodiment of the system and method of the present disclosure, there is a separate service network instance for each distance measurement. When finding a path between a pair of services based on a given relational data (e.g., distance measurement), the corresponding service network instance is used. For example, a user input query of two nodes and a given distance condition may be received for determining the shortest or optimal path between the two nodes based on the given relationship condition. At 112, the path with the shortest distance may be calculated. The path is calculated based on the service network instance built with the "shorted distance" distance measurement. For example, a known shortest path graph algorithm may be used to compute the path based on the distances in the given service network. At 114, path snippets are retrieved from individual workflows (e.g., received at 102) and are stitched. If there are multiple available snippets, several options are available, e.g., including choosing the most common snippet, or the one from the most popular workflows. Implementation details may be embedded in individual workflows such as how a pair of adjacent services in a workflow are wired, e.g., mapping of the output parameters of one service to the inputs of another, any data transformations therein, the protocol used (SOAP, REST, and/or others), and how access credentials are passed. Only topology and distance information may be extracted to the network instance in one embodiment.

Identification of at least two nodes may be received, e.g., at 110, via a computer-implemented user interface that allows a user to enter inputs. A distance condition may also be received from user input, for example, based on which a network instance is selected. In another aspect, if a distance condition is not input, the methodology of the present disclosure may compute paths for each distance condition or criteria. A search engine browser or like user interface may be provided for receiving inputs.

As described above, a method in one embodiment receives workflows {w1, w2, . . . , wn} as input. Each workflow wi is a graph {Ni, Ei} in which Ni is the set of nodes (services/operations) and Ei is the set of links between two nodes. The method may also receive service network topology SN={N, E}=w1+w2+ . . . +wn={N1+N2+ . . . +Nn, E1+E2+ . . . +En} as input. In one embodiment, the nodes and edges in the service network include a union of the nodes and edges in the individual input workflows. The method also receives as input distance measurement, DM. The method in one embodiment outputs a network instance.

Different algorithms may be used to measure distance, DM. In one embodiment, the distance measurement may be computed offline and used in computing the optimal path between a pair of given services.

For example, for shortest distance DM, in any workflow wi, D(nij,nik)=1 if there is an edge eijk; D(nij,nik)=infinite otherwise. This DM algorithm can find the shortest route between any two nodes.

Another example DM may include the number of least transfer. In any workflow wi, D(nij,nik)=1 if nij can reach nik in wi; D(nij,nik)=infinite otherwise. This DM algorithm can find the least transfer route between any two nodes.

Still another example DM may include shortest weighted distance. In any workflow wi, D(nij,nik)=1 if there is an edge eijk; D(nij,nik)=infinite otherwise. Each edge can be assigned a weight with a special meaning. For example, to calculate the most frequently used path: D(nj,nk)=1/Σi{D (nij,nik)=1}. The summation counts the number of times a pair of services are adjacent in the input workflows. Therefore, in this distance measurement, the more such occurrences, the shorter the distance.

Other distance measurements can be defined. Optimal path can be calculated using shortest path algorithm, for example, using known algorithms from graph theory to compute the shortest path between a pair of nodes.

Extension may be implemented based on duality. In the above distance measurement computations, the distance measurements have assigned weights to the edges of the service network graph. In another embodiment, weights on the nodes may be assigned. Known graph theory algorithms that compute the shortest distance based on node and/or edge weights may be used to compute shortest path, e.g., also based on node weights. Duality 1 example: in a network graph <N, E>, weight can also be defined on nodes N, rather than edges E. Nodes represent services which have different value (e.g., price, QoS, and/or other). Different distance measurements can be based on the value (e.g., price, QoS, and/or other). This technique may find an optimal service chain with best value (e.g., price, QoS, and/or other).

Distance calculation is similar to the case in which weights are defined on edges.

Duality 2 example: rather than a task network, a data-flow network <N, E> may be built where N is the set of data items, E represents the data flows. Distance may be defined on either nodes or edges.

In one aspect, the output (e.g., the new workflow having shortest or optimal path) that is computed in online phase, is transmitted to the user who queried using two services (e.g., FIG. 1, 110). This output workflow, with one or multiple paths, forms the recommendations sent to one or more users upon request. The workflow, for instance, defines the transition among different services, for example, transitioning of executing of one service to a next service in a computer network. Users may run one or many of the workflows with or without modification. The workflows provide one or more services, which the user may run in the given sequence(s). The recommended workflows represent the "optimal execution" according to a given criteria or condition, for example, the number of services, cost, popularity. Executing the workflow(s) in the given sequence(s) in one aspect controls the routing of invocations based on the path. A physical workflow engine, executable on a computer processor, may read the new workflow (workflow definition) and control the routing based on the definition.

Figure 3:
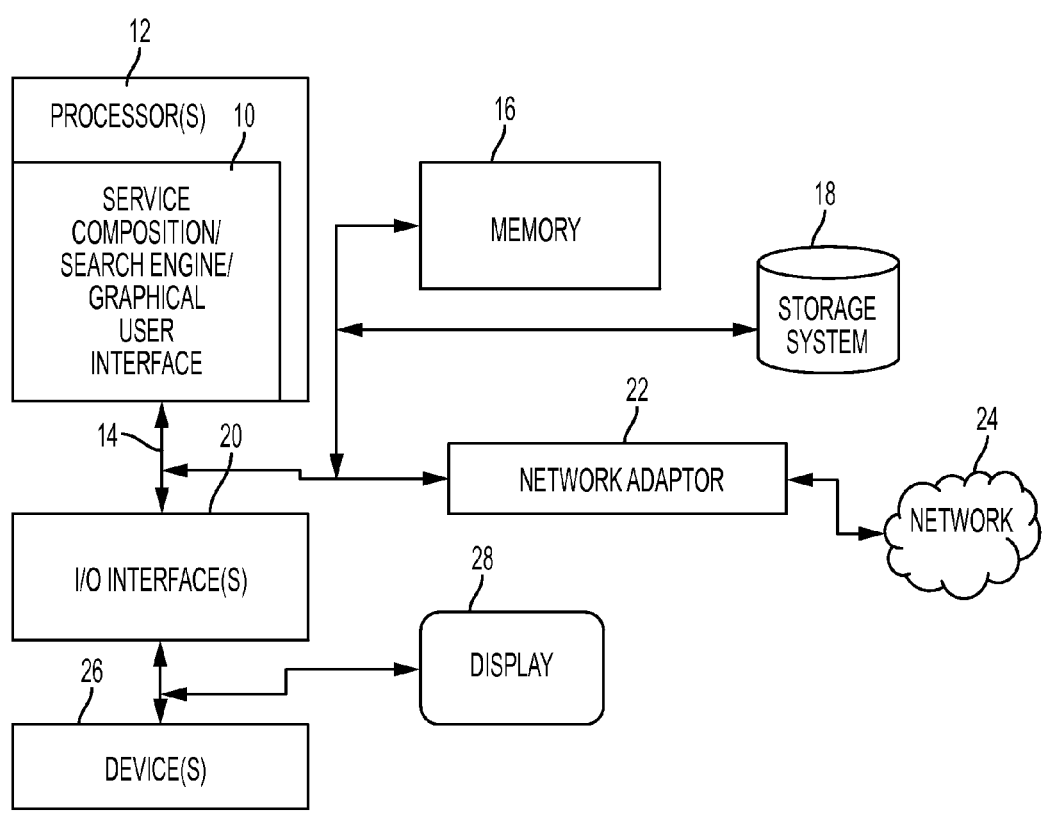
FIG. 3 illustrates a schematic of an example computer or processing system that may implement a network based service composition system in one embodiment of the present disclosure.

FIG. 3 illustrates a schematic of an example computer or processing system that may implement a network based service composition system in one embodiment of the present disclosure. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 3 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a composition module 10 that performs the methods described herein. The module 10 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

We claim:

1. A computer-implemented method of providing a network-based service composition, comprising:
    creating, by one or more hardware processors, a plurality of workflow definitions, a workflow definition of the plurality of workflow definitions comprising computer-implemented service operations and relational flows that connect the computer-implemented service operations, the workflow definition created based on executing the computer-implemented service operations in a given sequence;
    building, by one or more of the hardware processors, a network topology based on the workflow definitions;
    receiving, by one or more of the hardware processors, relational data that provide a distance from a computer-implemented service operation to another computer-implemented service operation, the relational data determined according to a selected condition, the distance computed as one divided by a number of occurrences where the computer-implemented service operation and said another computer-implemented service operation are invoked one after another adjacently;
    building, by one or more of the hardware processors, a network instance based on the network topology and the relational data; and
    controlling routing of the computer-implemented operations at execution according to the network instance.

2. The method of claim 1, wherein the selected condition comprises one or more of a number of direct connections, a number of transfers, or weight assigned to the computer-implemented service operations, or combinations thereof.

3. The method of claim 1, wherein the receiving of the distance relational data and the building of the network instance are performed iteratively to create multiple network instances, each having different distance condition.

4. The method of claim 1, further comprising receiving one or more service definitions, wherein the network topology and the network instance are built based further on the one or more service definitions.

5. The method of claim 1, wherein the computer-implemented service operations comprise web services.

6. The method of claim 1, further comprising:
    receiving identification of at least two computer-implemented services;
    determining a shortest path between the two computer-implemented services based on the network instance;
    retrieving, from the workflow definitions, workflow snippets that form the shortest path; and
    constructing the workflow snippets into a new workflow.

7. The method of claim 6, wherein a search engine implements the method to find web services and web interfaces on an internet.

8. The method of claim 1, wherein the relational flows comprise one or more of control flows and data flows.

9. A non-transitory computer readable storage medium storing a program of instructions executable by a machine to perform a method of providing a network based service composition, the method comprising:
    creating, by one or more hardware processors, a plurality of workflow definitions, a workflow definition of the plurality of workflow definitions comprising computer-implemented service operations and relational flows that connect the computer-implemented service operations, the workflow definition created based on executing the computer-implemented service operations in a given sequence;
    building, by one or more of the hardware processors, a network topology based on the workflow definitions;
    receiving, by one or more of the hardware processors, relational data that provide a distance from a computer-implemented service operation to another computer-implemented service operation, the relational data determined according to a selected condition, the distance computed as one divided by a number of occurrences where the computer-implemented service operation and said another computer-implemented service operation are invoked one after another adjacently;
    building, by one or more of the hardware processors, a network instance based on the network topology and the relational data; and
    controlling routing of the computer-implemented operations at execution according to the network instance.

10. The non-transitory computer readable storage medium of claim 9, wherein the selected condition comprises one or more of a number of direct connections, a number of transfers, or weight assigned to the computer-implemented service operations, or combinations thereof.

11. The non-transitory computer readable storage medium of claim 9, wherein the receiving of the relational data and the building of the network instance are performed iteratively to create multiple network instances, each having different distance condition.

12. The non-transitory computer readable storage medium of claim 9, further comprising receiving one or more service definitions, wherein the network topology and the network instance are built based further on the one or more service definitions.

13. The non-transitory computer readable storage medium of claim 9, wherein the computer-implemented service operations comprise web services.

14. The non-transitory computer readable storage medium of claim 9, further comprising:
    receiving identification of at least two computer-implemented services;
    determining a shortest path between the two computer-implemented services based on the network instance;
    retrieving, from the workflow definitions, workflow snippets that form the shortest path; and
    constructing the workflow snippets into a new workflow.

15. The non-transitory computer readable storage medium of claim 14, wherein a search engine implements the method to find web services and web interfaces from a network of computers.

16. A system of providing a network based service composition, comprising:

a memory device; and one or more hardware processors operatively coupled to the memory device, one or more of the hardware processors operable to create a plurality of workflow definitions, a workflow definition of the plurality of workflow definitions comprising computer-implemented service operations and relational flows that connect the computer-implemented service operations, the workflow definition created based on executing the computer-implemented service operations in a given sequence, one or more of the hardware processors further operable to build a network topology based on the workflow definitions, one or more of the hardware processors further operable to receive relational data that provide a distance from a computer-implemented service operation to another computer-implemented service operation, the relational data determined according to a selected condition, the distance computed as one divided by a number of occurrences where the computer-implemented service operation and said another computer-implemented service operation are invoked one after another adjacently, one or more of the hardware processors further operable to build a network instance based on the network topology and the relational data, and store a representation of the network instance in the memory device, the one or more of the hardware processors further operable to control routing of the computer-implemented operations during execution according to the network instance.

17. The system of claim 16, wherein the selected condition comprises one or more of a number of direct connections, a number of transfers, or weight assigned to the computer-implemented service operations, or combinations thereof.

18. The system of claim 16, wherein one or more of the hardware processors are operable to build multiple network instances, each having different distance condition.

19. The system of claim 16, wherein the computer-implemented service operations comprise web services.

20. The system of claim 19, wherein one or more of the hardware processors comprise a search engine operable to receive identification of at least two computer-implemented services, the search engine further operable to determine a shortest path between the two computer-implemented services based on the network instance, the search engine further operable to retrieve from the workflow definitions, workflow snippets that form the shortest path, the search engine further operable to construct the workflow snippets into a new workflow.

* * * * *